United States Patent [19]

Tokuda

[11] Patent Number: 4,937,615
[45] Date of Patent: Jun. 26, 1990

[54] PHOTOGRAPHIC PRINTING APPARATUS

[75] Inventor: Kanji Tokuda, Kanagawa, Japan

[73] Assignee: Fuji Photo Film Co., Ltd., Kanagawa, Japan

[21] Appl. No.: 249,536

[22] Filed: Sep. 26, 1988

[30] Foreign Application Priority Data

Sep. 25, 1987 [JP] Japan ................... 62-241343

[51] Int. Cl.$^5$ ............... G03B 27/72; G03B 27/52
[52] U.S. Cl. ................................. 355/35; 355/40
[58] Field of Search ............ 355/38, 41, 35, 77, 355/36, 40

[56] References Cited

U.S. PATENT DOCUMENTS

| | | | |
|---|---|---|---|
| 3,709,601 | 1/1973 | Zahn et al. | 355/35 X |
| 3,947,110 | 3/1976 | Yamada | 355/38 |
| 4,008,962 | 2/1977 | Napper | 355/77 |
| 4,293,215 | 10/1981 | Rosborough et al. | 355/77 |
| 4,294,537 | 10/1981 | Laska et al. | 355/35 |
| 4,417,811 | 11/1983 | Hamer | 355/77 |
| 4,432,637 | 2/1984 | Baschung | 355/35 |

FOREIGN PATENT DOCUMENTS

| | | |
|---|---|---|
| 301397 | 1/1989 | European Pat. Off. . |
| 2315294 | 10/1973 | Fed. Rep. of Germany . |
| 3818489 | 12/1988 | Fed. Rep. of Germany . |
| 648133 | 2/1955 | Switzerland . |
| 2191655 | 12/1987 | United Kingdom . |

*Primary Examiner*—Donald A. Griffin
*Attorney, Agent, or Firm*—Sughrue, Mion, Zinn, Macpeak & Seas

[57] ABSTRACT

A photographic printing apparatus in which the exposure value required for printing is manually corrected includes a storage medium which can be detachably set in the apparatus, and a storage/input portion for storing data in the storage medium. This enables the data to be utilized after the printing operation has been completed.

17 Claims, 5 Drawing Sheets

PHOTOGRAPHIC PRINTING APPARATUS

BACKGROUND OF THE INVENTION

1. Field of the Invention:

The present invention relates to a photographic printing apparatus, and more particularly, to a photographic printing apparatus for printing on printing paper images carried on a photographic film using a manually corrected exposure value.

2. Description of the Related Art:

Photographic printing apparatus are known, in which the images recorded on a photographic film, such as a developed negative, are printed on printing paper and the printed images are then developed so as to provide prints.

Such photographic printing apparatus fall into two categories, an automatic photographic printing apparatus that is called an automatic printer) in which the exposure value needed for printing on a printing paper the images carried on a film is automatically corrected, i.e., the printing operation is automatically conducted, and a manual photographic printing apparatus (that is called a manual printer) in which the exposure value required to print on a printing paper the images carried on a film is corrected by the operation of an operating portion which is conducted by an operator.

Automatic photographic printing apparatus are used to conduct in succession a series of processes including the development of a photographic film, printing of the images on that film on a printing paper, the development of the printing paper with the images printed thereon, and the cutting of that printing paper for each frame image.

On the other hand, manual photographic printing apparatus are employed to provide prints when the prints prepared by the above-described series of printing processes were unsatisfactory or to provide additional prints.

In the case where printing is conducted by the above-described sequence of processes using an automatic photographic printing apparatus, testing is conducted before printing is started, and printing is then performed with the automatic photographic printing apparatus on the basis of the test results. More specifically, a semi-circular notch is provided on the side of a photographic film by a notch puncher for each frame image, and data such as frame number data and exposure correction data to be used to correct the exposure value corresponding to the average transmission density (LATD) for the images on the film is recorded by a puncher on a paper tape which serves as a recording medium. The average transmission density is obtained by the automatic photographic printing apparatus through the actual measurement. Subsequently, the paper tape is set in the automatic photographic printing apparatus, and the film is conveyed in synchronism with the paper tape so as to detect the notches by a photoelectric switch or the like. During this operation, each time a notch is detected, the film is stopped at a position where the frame image corresponding to the detected notch is suitably located, and printing is then automatically conducted on the basis of the average transmission density or the exposure correction information recorded on the paper tape. Thereafter, the printing paper with the images printed thereon is developed by a developing device. The developed printing paper (prints), together with the paper tape, is set in a printing device. In this printing device, the exposure correction data and the frame number data recorded on the paper tape are read while the paper tape and the printing paper are being conveyed synchronously, and the data read is printed on the rear surface of the printing paper with the images printed thereon.

The printing paper on which data has been printed is cut for each frame image. Since each of the prints has the frame number for identifying the corresponding frame image on the film printed thereon, when printing has to be conducted again due to unsatisfactory printing results or when a customer orders additional prints, the prints can be readily made to correspond to the frame images on the photographic film.

As stated above, re-printing or additional printing is conducted using the manual photographic printing apparatus (that is called a manual printer), and this manual photographic printing operation involves redetermination of the exposure and manual correction of the exposure value.

In the manual photographic printing apparatus of the above-described type, the exposure value required for printing the film is corrected by the operation of the operating portion each time printing is conducted, but the obtained exposure correction information or frame number data is not recorded. Therefore such data cannot be utilized when re-printing is repeated several times due to unsatisfactory printing results or when the obtained prints are collated with the frame images on the photographic film.

SUMMARY OF THE INVENTION

In view of the above-described problems of the conventional printing apparatus, an object of the present invention is to provide a photographic printing apparatus which enables such data as the exposure correction data required to obtain a corrected exposure value or frame number data for identifying the frame images to be utilized in a subsequent processing by recording such data during re-printing or additional printing.

To this end, the present ivention provides a photographic printing apparatus in which an exposure value required to print images on a photographic film on printing paper is manually corrected. The photographic printing apparatus comprises means for inputting data thereto, and a recording medium on which the input data can be recorded, the recording medium being detachably set in the photographic printing apparatus.

In the thus-arranged photographic printing apparatus according to the present invention, data which has been input to the photographic printing apparatus is recorded on the recording medium by the data inputting means.

Further, the recording medium is detachably set in the photographic printing apparatus. Therefore, if the exposure correction data or frame numbers are recorded on the recording medium such as a paper tape, a magnetic tape, a floppy disk or an LSI card that can be carried from one place to another, they can be read by any of various devices other than the photographic printing apparatus after the printing paper has been developed, and the data read can be printed on the printing paper. In consequence, the problem of disappearance or fading of the characters or marks printed on the printing paper which would occur during developing process can be prevented.

Thus, in the photographic printing apparatus according to the present invention, the exposure correction data used to obtain a corrected exposure value required for printing or the frame number data for identifying the frame images are recorded so that it can be utilized in a subsequent printing operation.

DETAILED DESCRIPTION OF THE PREFERRED EMBODIMENTS

Figure 1:
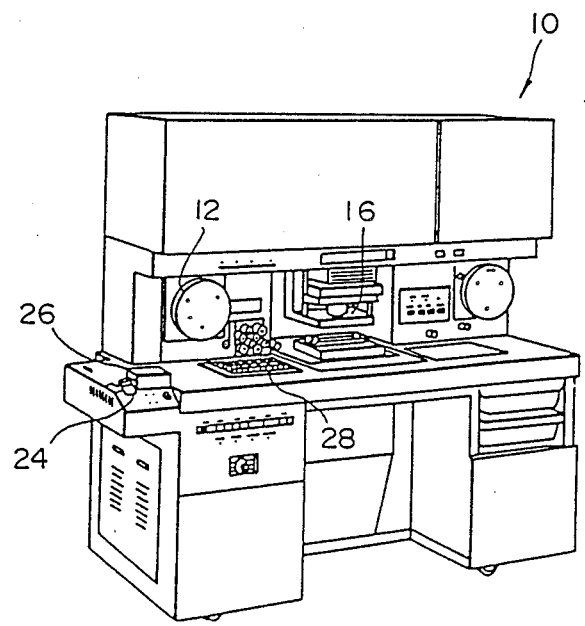
FIG. 1 is a perspective view of a photographic printing apparatus according to the present invention.
Figure 2:
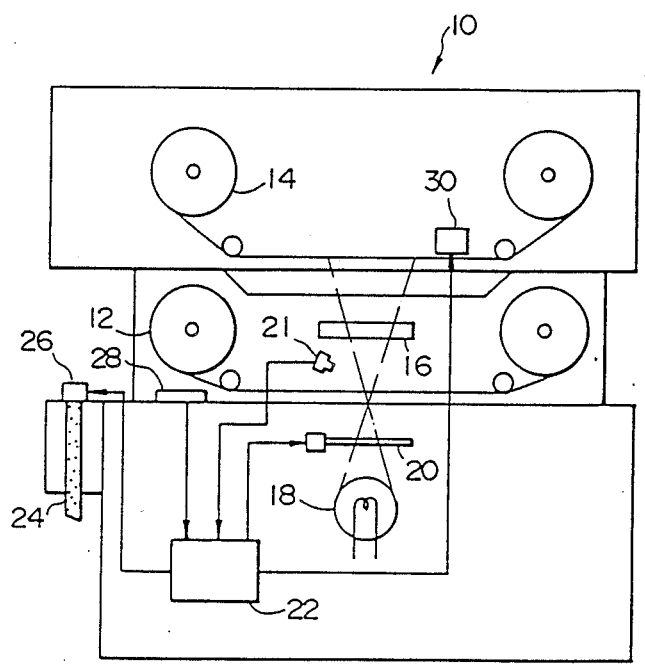
FIG. 2 is a schematic front view of the photographic printing apparatus of FIG. 1.
Figure 3:
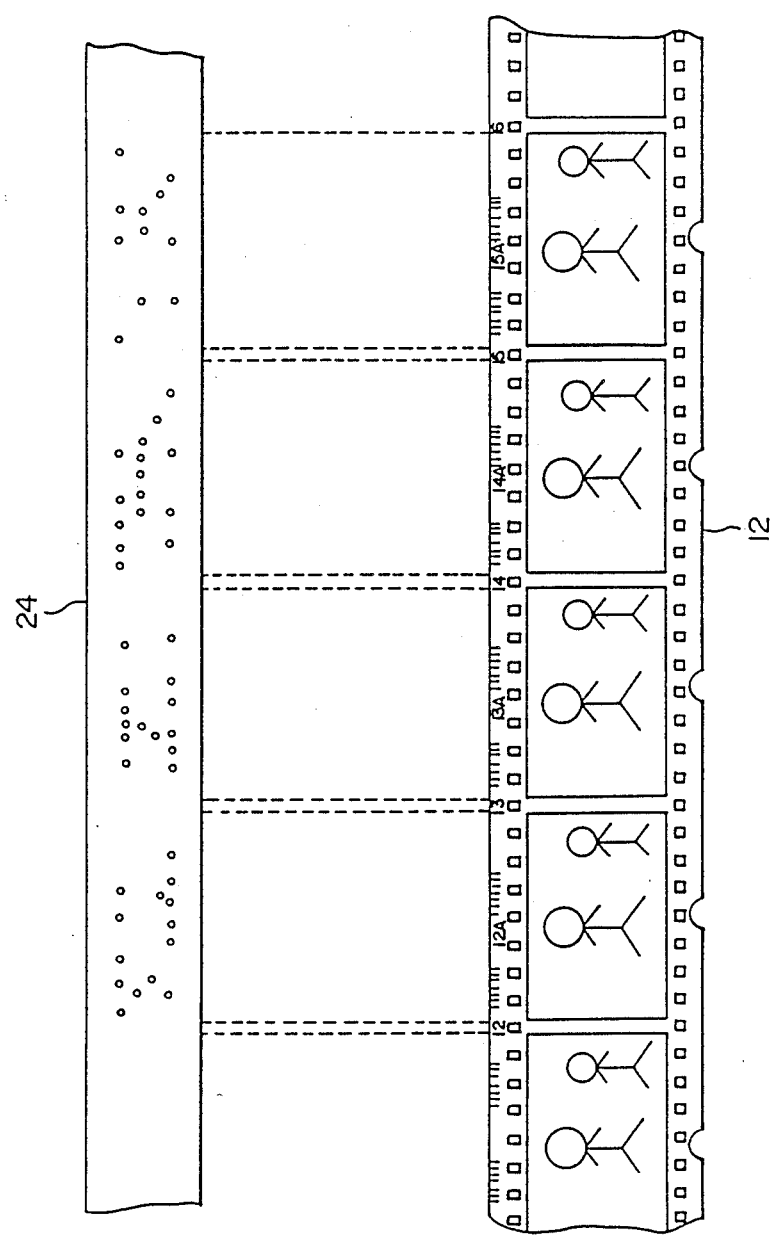
FIG. 3 is a plan view showing how a paper tape is made to correspond to a negative film.

The present invention will be described below by way of example with reference to the accompanying drawings in which FIG. 1 is a perspective view of a photographic printing apparatus 10 according to the present invention while FIG. 2 is a schematic front view of the photographic printing apparatus of FIG. 1.

The photographic printing apparatus 10 includes an optical system 16 and a light source 18 for printing images carried on a negative film 12 on a sheet of printing paper 14. A dimmer filter 20 is disposed between the negative film 12 and the light source 18. It is connected to a control circuit 22. A photometer 21 for measuring the average transmission density (LATD) for the images on the negative film 12 is disposed above the negative film 12. The photometer 21 is connected to the control circuit 22.

The photographic printing apparatus 10 also includes a paper tape puncher 26 which serves as a means for recording data on a paper tape 24. The paper tape puncher 26 is disposed at one end of the apparatus 10, and is connected to the control circuit 22.

A keyboard 28 which serves as a data inputting means is disposed at the front of the photographic printing apparatus 10. The keyboard 28 is connected to the control circuit 22. Exposure correction information corresponding to the average transmission density (LATD) for the frame images on the negative film 12 which is measured by the photometer 21 can be inputted to the control circuit 22 by the keyboard 28. The control circuit 22 actuates the dimmer filter 20 so as to adjust the exposure value for the negative film 12 to an optimum value on the basis of this information, and prints the images onto the printing paper 14. Also, the control circuit 22 actuates the paper tape puncher 26, and thereby records this information on the paper tape 24 on the basis of the information inputted thereto.

Frame numbers identifying the individual frame images on the negative film 12 can also be inputted to the control circuit 22 by the keyboard 28. The control circuit 22 actuates the paper tape puncher 26 so as to record the frame numbers corresponding to the individual frame images on the paper tape 24 on the basis of this information.

Figure 4:
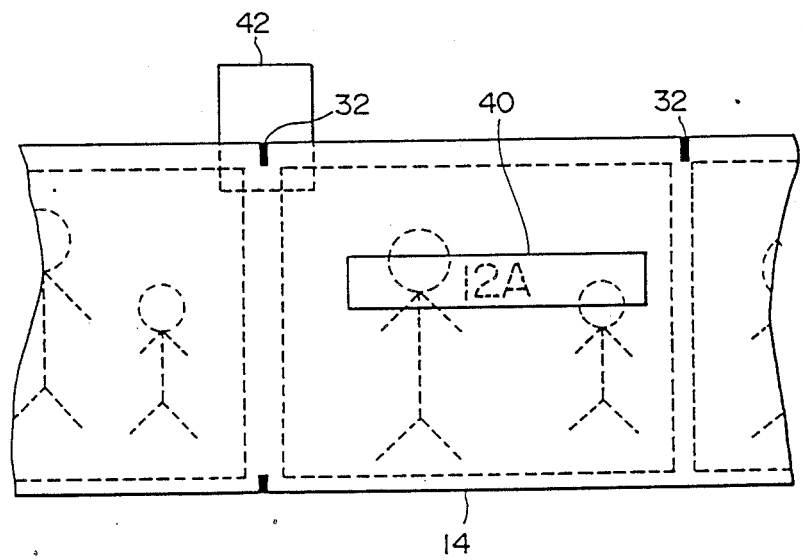
FIG. 4 is a rear view showing how a printing paper is made to correspond to a printing head.

A cut marker 30 for providing for each image cut marks 32 shown in FIG. 4 on the printing paper 14 with the images printed thereon is disposed on the path of conveyance of the printing paper 14.

Figure 5:
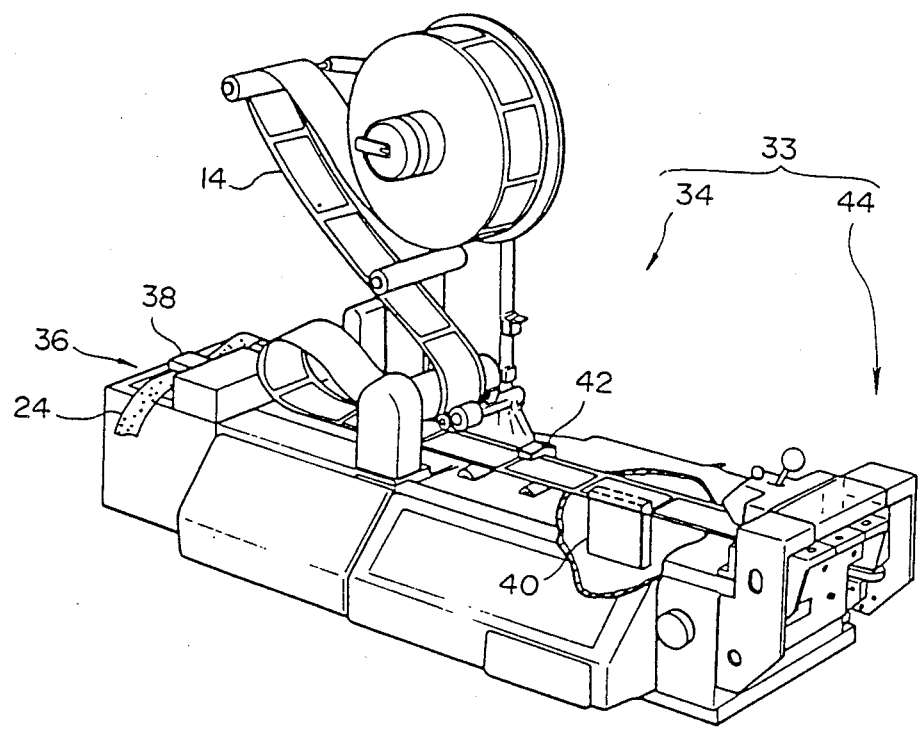
FIG. 5 is a perspective view of the essential parts of a printing device.

After being developed by a developing device, the printing paper 14 has frame numbers printed thereon by a printing device 34 for a finished prints cutter 33 which is disclosed by the present inventor in the specification of Japanese Patent Application No. 62-150396. As shown in FIG. 5, the printing device 34 includes a paper tape reader 36 for feeding the paper tape 24 in synchronism with the printing paper 14. The paper tape reader 36 has a reading head 38 for reading the frame numbers recorded on the paper tape 24 by the photographic printing apparatus 10 which corresponds to the images on the printing paper 14. The printing device 34 also includes a printing head 40 which is disposed in such a manner that it faces the rear surface of the printing paper 14 conveyed. The printing head 40 is designed to print on the printing paper 14 the frame numbers read by the reading head 38.

A cut mark sensor 42 for detecting the cut marks 32 provided by the cut marker 30 of the photographic printing apparatus 10 is disposed on the path of conveyance of the printing paper 14.

Next, the operation of the present embodiment will be described below.

In the photographic printing apparatus, the average transmission density (LATD) of the frame images on the developed negative film 12 is measured by the photometer 21 so as to enable the exposure state to be judged, and exposure correction data required for printing is inputted to the control circuit 22 through the keyboard 28. The control circuit 22 actuates the dimmer filter 20 so as to adjust the exposure value for the negative film 12 to an optimum value on the basis of this information, and the images are then printed on the printing paper 14. The control circuit 22 also actuates the paper tape puncher 26 and thereby records the exposure correction data on the paper tape 24 on the basis of the information inputted thereto.

The cut marks 32 are appended to the printing paper 14 on which the images have been printed, for each frame image by the cut marker 30.

Moreover, the frame numbers on the negative film 12 which correspond to the images printed on the printing paper are inputted to the control circuit 22 through the keyboard 28, and the control circuit 22 actuates the paper tape puncher 26 so as to record the frame numbers on the paper tape 24 on the basis of this information.

The printing paper 14 on which the images have been printed and to which the cut marks 32 have been appended in the photographic printing apparatus 10 is developed by a developing device, and the developed printing paper, together with the paper tape 24, is then fed to the finished prints cutter 33.

In the printer 34 in the finished prints cutter 33, the printing paper 14 is conveyed in synchronism with the paper tape 24. While the printing paper 14 is conveyed, the cut marks 32 appended during the printing process are detected by the cut mark sensor 42. Each time the cut mark 32 is detected, the feeding of the printing paper 14 is stopped, and the frame number data recorded on the paper tape 24 is read by the reading head 38 of the paper tape reader 36, the read data being printed on the rear surface of the printing paper 14 by the printing head 40.

Thus, the use of the paper tape 24 enables the frame numbers corresponding to the frame images to be printed after the printing paper 14 has been developed. In consequence, the problem of disappearance or fading of the printed characters or marks can be prevented which would otherwise occur due to immersion of the printing paper 14 into the developer.

The printing paper 14 on which the frame numbers have been printed is cut for each frame image by a cutter 44.

In the present invention, when re-printing is conducted again due to unsatisfactory printing results or when a customer re-orders additional prints, an optimum exposure value required for printing can be obtained by referring to the exposure correction data recorded on the paper tape 24, thus increasing working efficiency.

In the above-described embodiment, the frame number data which is appended to the negative film 12 and which corresponds to the images printed on the printing paper is recorded on the paper tape 24 through the keyboard 28. However, a bar code reader for reading the bar codes appended to the negative film 12 for identifying the frame images may be provided so as to enable the frame number data to be automatically recorded on the paper tape 24.

In the present emboidment, both of the exposure correction data and the frame number data are recorded on the paper tape 24 which serves as a recording medium. However, either of these two types of data may be recorded. Alternatively, channel data or other data such as that representing the contents of irregular operations or the name of a laboratory may be recorded in addition to the above-described data.

The present embodiment employs a paper tape as a recording medium. However, a magnetic tape, a floppy disk, an optical memory, an optical disk, a semiconductor memory such as an LSI card or an IC card may also be used as the recording medium. It is to be noted that the semiconductor memory is convenient since another type of data representing the operation conditions of a printer can also be stored.

What is claimed is:

1. A photographic printing apparatus in which an exposure value required to print a frame image of a photographic film on a front surface of a printing paper is manually corrected, comprising:
    means for manually inputting printing data to said photographic printing apparatus, said printing data being necessary for processing said frame image on said printing paper; and
    a storage medium for recording said manually inputted printing data and for recording simultaneously corresponding frame number data which is automatically read from said photographic film when the printing data is manually inputted to said photographic printing apparatus by said inputting means, said storage medium being detachably set in said photographic printing apparatus, whereby said printing data and frame number data recorded in said storage medium are subsequently recorded on a rear surface of said printing paper directly opposite the corresponding printed frame image after said printing paper has been developed.

2. A photographic printing apparatus according to claim 1, wherein said printing data includes exposure correction data used to obtain a corrected exposure value required for printing.

3. A photographic printing apparatus according to claim 2, further including storage/input means for storing said data in said storage medium inputted to said photographic printing apparatus.

4. A photographic printing apparatus according to claim 3, wherein said storage medium comprises a paper tape, and said storage/input means comprises a paper tape puncher.

5. A photographic printing apparatus according to claim 3, wherein said storage medium comprises one of a magnetic tape, a floppy disk, an optical disk, an optical memory and a semiconductor memory.

6. A photographic printing apparatus according to claim 3, further including a control means for controlling the exposure value to an optimum value on the basis of the data input through said data inputting means.

7. A photographic printing apparatus according to claim 6, wherein said control means is arranged such that it controls an operation of said storage/input means.

8. A photographic printing apparatus according to claim 1, wherein said data inputting means comprises a keyboard.

9. A photographic printing apparatus according to claim 1, further comprising a reading head to read both said printing data and said corresponding frame number data in the storage medium, and a writing head to record said printing data and said corresponding frame number data on said rear surface of the printing paper.

10. A photographic printing apparatus for manually correcting the exposure value required for printing a frame image of a photographic film on a front surface of a printing paper, comprising:
    a storage medium for storing printing data and corresponding frame number data to identify the frame image, being detachably set in said photographic printing apparatus;
    means for manually inputting said printing data to said photographic printing apparatus, said printing data being necessary for processing said frame image on said printing paper; and
    storage/input means for simultaneously storing said printing data which is manually inputted and said corresponding frame number data which is automatically read in the storage medium at the same time of manually inputting said printing data to said photographic printing apparatus, whereby said printing data stored in said storage medium is subsequently recorded on a rear surface of said printing paper directly opposite the corresponding printing frame image after said printing paper has been developed.

11. A photographic printing apparatus according to claim 10, wherein said printing data includes exposure correction data used to obtain a corrected exposure value required for printing said image frame.

12. A photographic printing apparatus according to claim 11, wherein said storage medium comprises a paper tape, and said storage/input means comprises a paper tape puncher.

13. A photographic printing apparatus according to claim 11, wherein said storage medium comprises one of a magnetic tape, a floppy disk, an optical disk, an optical memory and a semiconductor memory.

14. A photographic printing apparatus according to claim 10, wherein said data inputting means comprises a keyboard.

15. A photographic printing apparatus according to claim 10, further including a control circuit for controlling the exposure value to an optimum value on the basis of the data input through said data inputting means.

16. A photographic printing apparatus according to claim 15, wherein said control circuit is arranged such that it controls an operation of said storage/input means so as to store said data in said storage medium.

17. A photographic printing apparatus according to claim 10, further comprising a reading head to read both said printing data and said corresponding frame number data in the storage medium, and a writing head to record said printing data and said corresponding frame number data on said rear surface of the printing paper.

* * * * *